United States Patent
Hadjigeorghiou

[15] 3,702,505

[45] Nov. 14, 1972

[54] EDUCATIONAL AID

[72] Inventor: Andreas Hadjigeorghiou, 69 Ferndale Road, London S.W.4, England

[22] Filed: Aug. 19, 1971

[21] Appl. No.: 173,192

[30] Foreign Application Priority Data

Aug. 26, 1970  Great Britain..........40,992/70

[52] U.S. Cl.....................................................35/34
[51] Int. Cl..............................................G09b 23/04
[58] Field of Search.........................35/34, 30, 31 A

[56] References Cited

UNITED STATES PATENTS

| | | | |
|---|---|---|---|
| 3,777,718 | 4/1968 | Savin et al. | 35/34 |
| 3,382,591 | 5/1968 | Savin et al. | 35/34 |
| 2,797,499 | 7/1957 | Lagerdahl | 35/31 A |

*Primary Examiner*—Wm. H. Grieb
*Attorney*—Sughrue, Rothwell, Mion, Zinn & Macpeak

[57] ABSTRACT

An educational aid for use in illustrating various geometrical properties of a circle comprises a baseboard having a circle inscribed thereon, pins around the circumference of the circle and at the center of the circle so that endless rubber or elastic bands can be placed around the pins to define angles at the center and at the circumference of the circle, and a rotatable disc concentric with the circle so that the bands overlie the disc. One half of the disc is divided by radial lines into sectors for measuring angles at the center of the circle. The other half of the disc has lines radiating from a common point on the circumference of said circle for measuring angles at the circumference of the circle.

7 Claims, 3 Drawing Figures

INVENTOR
ANDREAS HADJIGEORGHIOU

INVENTOR
ANDREAS HADJIGEORGHIOU

EDUCATIONAL AID

This invention relates to an educational aid.

It is an object of the invention to provide an educational aid which assists students to understand angular properties of circles.

According to the invention there is provided an educational aid comprising a base, a circular disc rotatably mounted on the base, a circle marked on the base concentric with the disc, a diametrical line marked on the disc to divide the disc into two semi-circles, radial lines marked on the disc in one of the semi-circles to divide the respective semi-circles into a plurality of sectors, straight lines marked on the disc in the other semi-circle so as to radiate from a common point on said circle for any given position of the disc relative to the base, marked figures indicating the angles made by said lines with given reference directions, and elements arranged around the disc, a plurality of elements being arranged in coincidence with said circle such that a flexible filamentary element can be extended between any selected group of said elements to define one or more angles at the circumference of the circle and / or at the center of the circle. The flexible filamentary element may be for example a rubber band or a piece of string.

The invention will be described by way of example with reference to the accompanying drawings, wherein.

Figure 1:
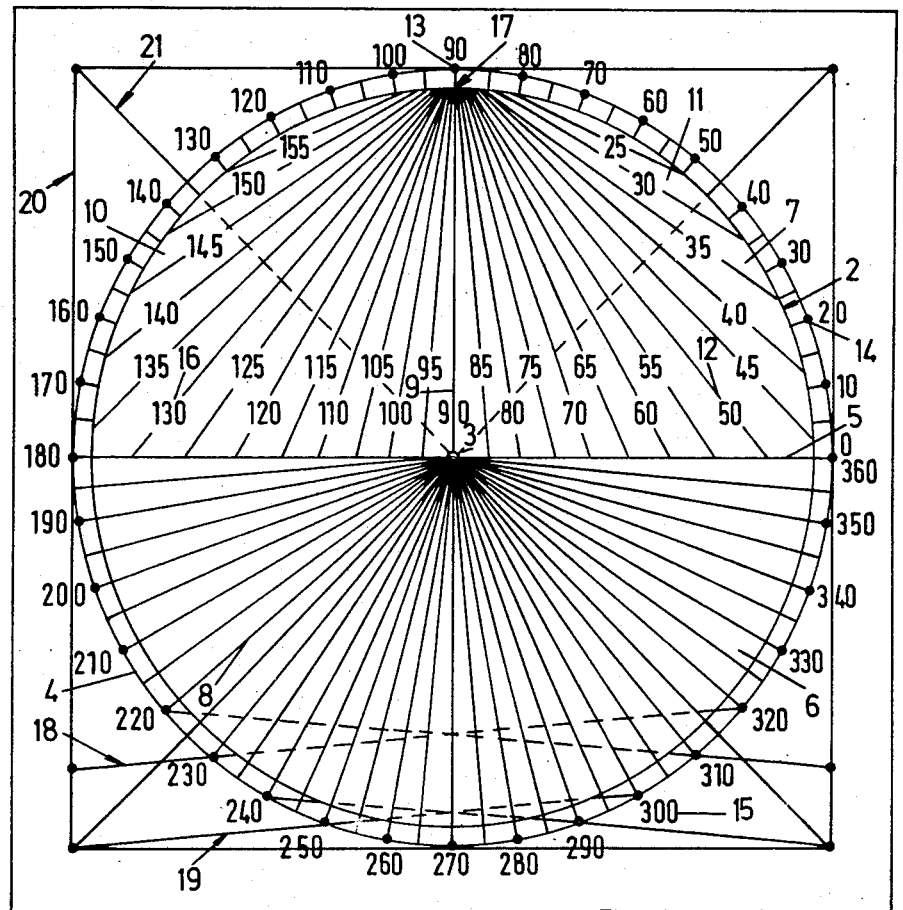
FIG. 1 is a plan view of an educational aid in accordance with the invention.
Figure 2:
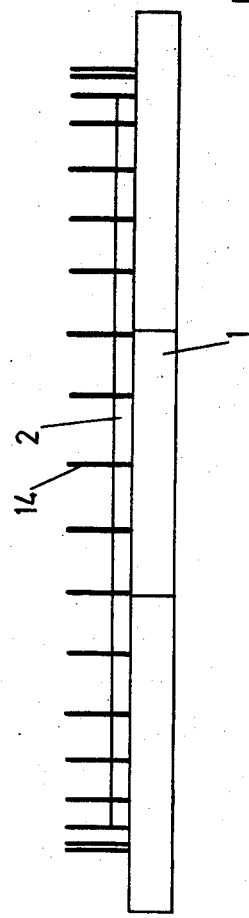
FIG. 2 is a front view of the educational aid of FIG. 1.
Figure 3:
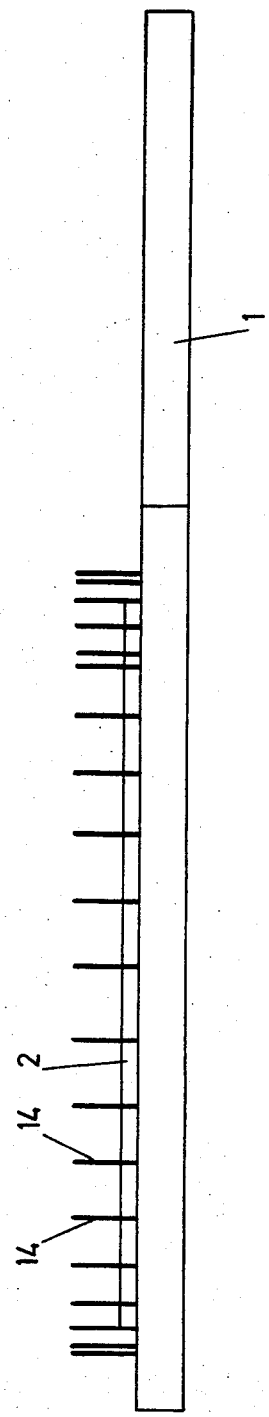
FIG. 3 is a side view of the educational aid of FIG. 1.

The illustrated educational aid comprises a base 1, a disc 2 rotatably mounted on the base 1 by means of a pivot 3, a circle 4 marked on the base 1, concentric with the pivot 3, a line 5 marked on the disc 1 to divide the disc 3 into a lower (as shown) semi-circle 6 and an upper (as shown) semi-circle 7, thirty-five lines 8 marked on the disc 1 to divide the semi-circle 6 into sectors each subtending five degrees at the pivot 3, a line 9 marked on the disc to divide the upper semi-circle 7 into two right-angled sectors or quadrants 10 and 11, twenty-seven straight lines 12 (the number can be increased or decreased, depending on the size of the device and/or the desired accuracy) marked on the disc, radiating from a point 13 where the line 9 meets the circumference of the circle 4 when the disc 2 is in the position shown, so as to mark 5° angles on the disc from the tangent to circle 4 at that point, and thirty-six pins 14 on the base 2, at ten-degree intervals around the disc 3, (again the number can be likewise increased or decreased, to provide more or less accuracy and a greater or lesser number of regular polygons), on the circumference of the circle 4. The circle 4 is circumscribed by a square 20, (the four sides of which are tangential to circle 4), diametral marked lines 5 and 9 into four equal squares and further divided by marked diagonals 21 into eight congruent right-angled triangles.

In addition, there are members 15 marked on the base 1, marking the 10° angles around the disc 2, and numbers 16 marked on the disc 2, marking the various angles of the lines 9 and 12 from the tangent to circle 4 at the point 13, the line 9 being accordingly marked 90°.

Four marked lines 18 and 19 on base 1 are used in connection with the corollary to Theorem 3, mentioned below.

In use, an arc of the circle 4 may be defined by stretching a rubber band (not shown) around any two of the pins 14. Then, any angle subtended by the arc may be defined by further stretching the rubber band over any third one of the pins 14. The angle subtended at the circumference of the circle formed by the circle 4 may then be measured by rotating the disc 2 to bring the point 17 in line with the third pin and pivot 3. If the rubber band is then removed from that "third" pin and stretched around any other "third" pin in the same segment of the circle, and the angle likewise measured by rotating the disc 2 to bring point 17 in line with the "third" pin and pivot 3, the angle will be found empirically to be the same. If the rubber band, after removal from the "third" pin 14, is now passed around the pin forming the pivot 3, and the angle subtended by the arc at the center, measured by means of the lines 8, the angle subtended at the center will be found empirically to be twice the angle subtended at the circumference.

More particularly, the theorems which may be demonstrated empirically by means of the educational aid include the following:

1. The angle which an arc of a circle subtends at the center is double that which it subtends at any point on the remaining arc of the circumference.

2. Angles in the same segment of a circle are equal.

3. If a quadrilateral be inscribed in a circle the sum of each pair of opposite angles is equal to two right angles.

Corollary to Theorem 3. In any cyclic quadrilateral any exterior angle is equal to the opposite interior angle 4. (i) Any angle in a semi-circle is a right angle.

(ii) Any angle in a segment greater than a semi-circle is less than a right angle;

(iii) Any angle in a segment less than a semi-circle is greater than a right angle.

5. If a chord be drawn from the point of contact of a tangent to a circle, then each of the angles which the chord makes with the tangent is equal to the angle in the alternate segment of the circle.

The number of lines 8 and hence the included angle of each sector in the semi-circle 6 may be varied as desired, depending upon the size of the device and the accuracy desired.

The device may be used to demonstrate many mathematical concepts, such as fractions, regular and irregular polygons, circle graphs, symmetry, limit and tangent, and for measuring the angles of a triangle and the angles at a point, such as complementary angles, supplementary angles and vertically opposite angles.

I claim:

1. An educational aid comprising a base, a circular disc rotatably mounted on the base, a circle marked on the base concentric with the disc, a diametrical line marked on the disc to divide the disc into two semi-circles, radial lines marked on the disc in one of the semi-circles to divide the respective semi-circle into a plurality of sectors, straight lines marked on the disc in the other semi-circle so as to radiate from a common point on said circle for any given position of the disc relative to the base, marked figures indicating the angles made by said lines with given reference directions, and a plurality of elements arranged around the disc, said plurality of elements being arranged in coincidence with said circle such that a flexible filamentary element can be extended between any selected group of said elements to define one or more angles at the circumference of the circle and/or at the center of the circle.

2. An educational aid as claimed in claim 1 wherein said common point on said circle for any given position of the disc relative to the base is the 90° point of said other semi-circle.

3. An educational aid as claimed in claim 1 wherein the marked figures comprise marked figures on the disc indicating the angles made by said straight lines with a tangent to said circle at said common point.

4. An educational aid as claimed in claim 1 wherein the marked figures comprise marked figures on the base indicating a plurality of angles at the center of the disc and of said circle between a reference radius to a fixed reference point on the circle and a plurality of other radii to respective points on said circle.

5. An educational aid as claimed in claim 1 wherein each said element is in the form of a pin.

6. An educational aid as claimed in claim 1 wherein a square is marked on the base such that the four sides of the square are tangential to the circle and wherein visible portions of the diagonals of the square are also marked on the base.

7. An educational aid as claimed in claim 1 wherein the base is integral with a handle.

* * * * *